United States Patent
Tumey et al.

(10) Patent No.: US 7,020,310 B2
(45) Date of Patent: Mar. 28, 2006

(54) ANIMATED TOY UTILIZING ARTIFICIAL INTELLIGENCE AND FINGERPRINT VERIFICATION

(75) Inventors: David M. Tumey, San Antonio, TX (US); Tianning Xu, San Antonio, TX (US); Craig M. Arndt, Valkaria, FL (US)

(73) Assignee: Intelligent Verification Systems, Inc., San Antonio, TX (US)

( * ) Notice: Subject to any disclaimer, the term of this patent is extended or adjusted under 35 U.S.C. 154(b) by 0 days.

(21) Appl. No.: 10/932,203

(22) Filed: Sep. 1, 2004

(65) Prior Publication Data

US 2005/0031172 A1 Feb. 10, 2005

Related U.S. Application Data

(63) Continuation of application No. 09/588,085, filed on Jun. 6, 2000, now Pat. No. 6,807,291.

(60) Provisional application No. 60/137,569, filed on Jun. 4, 1999.

(51) Int. Cl.
*G06K 9/00* (2006.01)
(52) U.S. Cl. .................. 382/124; 446/484; 434/155
(58) Field of Classification Search ........ 382/124–127, 382/115–123; 446/484; 434/155
See application file for complete search history.

(56) References Cited

U.S. PATENT DOCUMENTS

| 5,420,936 | A | * | 5/1995 | Fitzpatrick et al. | 382/124 |
|---|---|---|---|---|---|
| 5,603,179 | A | * | 2/1997 | Adams | 42/70.08 |
| 6,099,408 | A | * | 8/2000 | Schneier et al. | 463/29 |
| 6,100,811 | A | * | 8/2000 | Hsu et al. | 340/5.83 |
| 6,160,540 | A | * | 12/2000 | Fishkin et al. | 345/184 |
| 6,178,510 | B1 | * | 1/2001 | O'Connor et al. | 713/201 |
| 6,282,304 | B1 | * | 8/2001 | Novikov et al. | 382/125 |
| 6,337,918 | B1 | * | 1/2002 | Holehan | 382/124 |
| 6,428,321 | B1 | * | 8/2002 | Jurmain et al. | 434/238 |
| 6,501,846 | B1 | * | 12/2002 | Dickinson et al. | 382/124 |

* cited by examiner

*Primary Examiner*—Bhavesh M. Mehta
*Assistant Examiner*—Aaron Carter
(74) *Attorney, Agent, or Firm*—Eric W. Cernyar

(57) ABSTRACT

An articulated and animated toy capable of recognizing human users and interacting therewith includes a computer-based device storing encoded first human fingerprint data, a fingerprint sensor for acquirin data representative of a second human fingerprint, and software for fingerprint verification. The apparatus can further include software for recognizing speech, generating speech and controlling animation of the articulated toy. In addition, the toy is capable of learning and storing information pertaining to each of said human users such as name, age, sex, favorite color, etc., and to interact with each of said human users on an individual basis, providing entertainment tailored specifically to each of said human users.

12 Claims, 3 Drawing Sheets

ANIMATED TOY UTILIZING ARTIFICIAL INTELLIGENCE AND FINGERPRINT VERIFICATION

RELATED APPLICATION INFORMATION

This application is a continuation of U.S. patent application Ser. No. 09/588,085 filed Jun. 6, 2000, now U.S. Pat. No. 6,807,291, and claims priority to provisional application 60/137,569 filed Jun. 4, 1999, both of which are herein incorporated by reference.

FIELD OF THE INVENTION

The present invention is generally directed to an apparatus and method for integrating a fingerprint sensor and computer-based algorithm with an articulated and animated toy capable of recognizing a human user, and providing entertainment and interaction with said human user in response thereto. In addition, said computer-based toy can learn and store in resident memory, specific information about said human user and further access and recall said information for use in interacting with said human user, such as integrating personal information about said user into a story or game, or controlling access to the Internet after said user is identified.

BACKGROUND

There are a number of new articulated and animated toys capable of interacting with human users in a way which appears intelligent which are well known in the art and commercially available under such trademarks as Furby® from Tiger Electronics, Ltd., and Barney® from MicroSoft Inc. These toys are capable of understanding speech, speaking in a natural language and demonstrating limited animation such as mouth, eye and ear movements. In addition, prior to the development of these more sophisticated toys, which generally include an embedded microprocessor and computer-based algorithm, other predecessors such as that commonly known under the trademark Teddy Ruxpin™ from YES! Entertainment Corporation, are also capable of exhibiting semi-intelligent behavior through speech and animation. Teddy Ruxpin™, and other toys like it, utilize a tape mechanism to provide the sound and animation control. Without exception, to date, a toy has never been developed which is capable of recognizing the human user who is playing with the toy. The advantage of such capability is immediately obvious as it increases the sophistication and intelligence of a toy to levels heretofore unseen. A toy with the capability of recognizing its human user can learn specific information about said human user and interact individually with a number of said human users by providing tailored entertainment. In addition, toys capable of recognizing an individual human user could control access to the Internet through integrated web browser software and thus provide protection, especially for young children, from inappropriate web site content.

There exists many methods for creating the semblance of intelligence in a toy or computer game. Toys with animated moving parts are commonplace and anyone of ordinary skill in the art will be familiar with several methods to fabricate quasi-intelligent articulated toys. Similarly there exists many methods for the biometric identification of humans which includes face recognition, voice recognition, iris scanning, retina imaging as well as fingerprint verification. Iris and retina identification systems are considered "invasive", expensive and not practical for applications such as integrating with a toy where limited computer memory storage is available and manufacturing costs must be minimized. Voice recognition, which is not to be confused with speech recognition, is somewhat less invasive, however it is cost prohibitive and can require excessive memory storage space for the various voice "templates". In addition, identification processing delays can be excessive and unacceptable for many applications.

Fingerprint verification is a minimally invasive way to identify a human user. A fingerprint verification and identification system can be constructed in such a way that its operation is simple and natural for a human user. With recent advances in the performance of inexpensive single board computers and embedded microprocessors, it has become possible to implement a practical and cost effective fingerprint verification system for use in providing human user recognition for toys or computer games.

Although many inventors have offered approaches to verifying human fingerprints for recognizing human users, none have succeeded in producing a system that would be viable for use in an articulated and animated toy or computer game. Part of the reason for this lies in the severe constraints imposed on the sensor apparatus such as size and physical configuration. Another reason is that the complexity of the algorithms and the hardware necessary to implement them makes such a recognition system cost prohibitive for use with a toy.

The present invention overcomes these limitations by combining streamlined algorithms with advanced microprocessor architectures. The algorithms of the present invention have been optimized to run quickly on small inexpensive single board computers and embedded microprocessors.

SUMMARY

It is an object of the present invention to improve the apparatus and method for fingerprint verification of human users for use with articulated and animated toys or computer games.

It is another object of the present invention to improve the apparatus and method for creating the semblance of intelligence in an articulated and animated toy or computer game.

It is still another object of the present invention to improve the method for providing protection, especially for young children, from inappropriate Internet web site content.

Accordingly, one embodiment of the present invention is directed to an apparatus for an articulated and animated toy capable of recognizing human users and interacting therewith which includes a computer-based device having stored thereon encoded first human fingerprint data, a fingerprint sensor for acquiring data representative of a second human fingerprint, and software resident within said computer-based device for fingerprint verification, which includes minutiae analysis, neural networks, or another equivalent algorithm for comparing said first human fingerprint data with said second human fingerprint data and producing an output signal therefrom for use in identifying said human users. The apparatus can further include software for recognizing speech, generating speech and controlling animation of the articulated toy. In addition, said computer-based device is capable of learning and storing information pertaining to each of said human users such as name, age, sex, favorite color, etc., and to interact with each of said human users on an individual basis, providing entertainment tailored specifically to each of said human users. In addition, the apparatus can control access to the Internet via integrated web browser software and thus provide protection, especially for young children, from inappropriate web site content.

Other objects and advantages will be readily apparent to those of ordinary skill in the art upon viewing the drawings and reading the detailed description hereafter.

DETAILED DESCRIPTION

Figure 1:
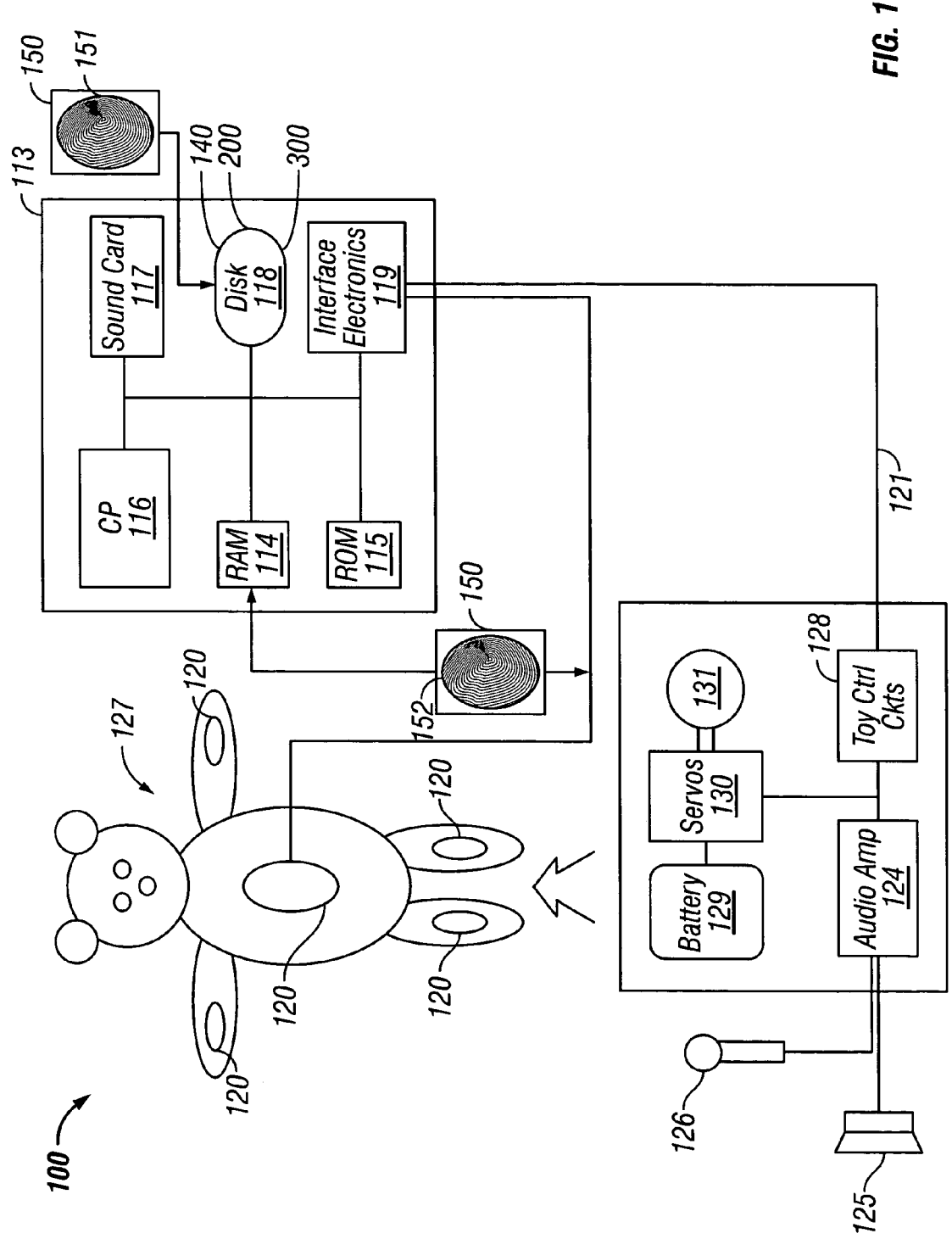
FIG. 1 shows a block diagram of an aspect of the present invention for integrating a fingerprint sensor with an animated and articulated toy.

Referring to the drawings, an apparatus for an articulated and animated toy capable of recognizing human users 150 and interacting therewith of the present invention is generally referred to by the numeral 100. Referring now particularly to FIG. 1, the apparatus 100 includes a computer 113 having a central processor (CP) 116 such as is well known in the art and commercially available under the trademarks Intel® 486 or Pentium®, conventional non-volatile Random Access Memory (RAM) 114, conventional Read Only Memory (ROM) 115, conventional disk storage device 118, and a sound card 117 such as is commercially available under the trademark SoundBlaster™. Computer 113 can be of a standard PC configuration such as is commercially available under the trademarks Compaq® or Dell®, or can be miniaturized and embedded directly in the toy 127 itself. Computer 113 is further operably associated with interface electronics 119 and fingerprint sensor 120. The fingerprint sensor 120, mounted inside the toy 127, such as a plush teddy bear, doll or sophisticated animated and articulated toy, can be one of many devices well known in the art and available commercially under the trademarks Digital Persona U.areU™, Veridicom OpenTouch™, Thomson FingerChip™, and AuthenTec FingerLoc™. The interface electronics 119 can be one of many off-the-shelf units well known by anyone of ordinary skill in the art and commonly employed in personal computers for the acquisition of digital signals such as a standard RS-232 serial port or Universal Serial Bus (USB). The fingerprint sensor 120 described herein above, can be mounted in the head, belly, back, hand, arm, leg or foot of toy 127, thus providing a simple means by which a human user 150, such as a child, can access and operate the toy's biometric component.

The computer 113 further has operably associated therewith fingerprint verification software 140 which compares a first digitized human fingerprint 151, stored on said disk storage device 118 with a second digitized human fingerprint 152 acquired in real-time from human user 150 and provides a signal indicative of verification or non-verification of human user 150. The fingerprint verification software 140 can be of one of several algorithms known by anyone who is of ordinary skill in the art such as minutiae analysis 200 or neural network 300 or another equivalent algorithm, the particulars of which are further described hereinafter.

A communications cable 121 is likewise associated with the computer 113 and operably connected to interface electronics 119 for providing speech and articulation control signals to interface electronics 119. If computer 113 is configured as a standard PC, the communications cable 121 will be external, while if computer 113 is embedded directly in the toy 127, the communications cable 121 will be internal.

Interface electronics 119 is operably connected to the toy's 127 internal control circuits 128. The control circuit 128 is of a standard type such as is well known to anyone of ordinary skill in the art and employed in several of the toys described in detail herein above, and controls the basic functions of the toy's 127 articulation, including the animation thereof. Control circuit 128 is operably connected to a battery 129 and electronic servo motors 130. Servo motors 130 are flexibly coupled to mechanical articulating means 131. Servo motors 130 are arranged in such a way as to cause animation of various features of the toy 127 such as mouth, eye and ear movements.

In addition to the control functions, audio amplifier 124 speaker 125, and microphone 126 are also operatively connected to sound card 117 which allows the toy 127 to recognize speech, and speak to the human user as part of its interaction capability.

The apparatus of the present invention 100 can make use of minutiae analysis 200, neural networks 300 or another equivalent software algorithm to generate an output signal indicative of verification or non-verification of a human user 150.

There are a variety of methods by which the identification and verification element of the present invention can be implemented. Although the methods differ in computational structure, it is widely accepted that they are functionally equivalent. An example of two practical techniques, minutiae analysis 200 and neural network 300, each successfully implemented by applicant, are provided herein below and are depicted in FIG. 2 and FIG. 3 respectively.

Figure 2:
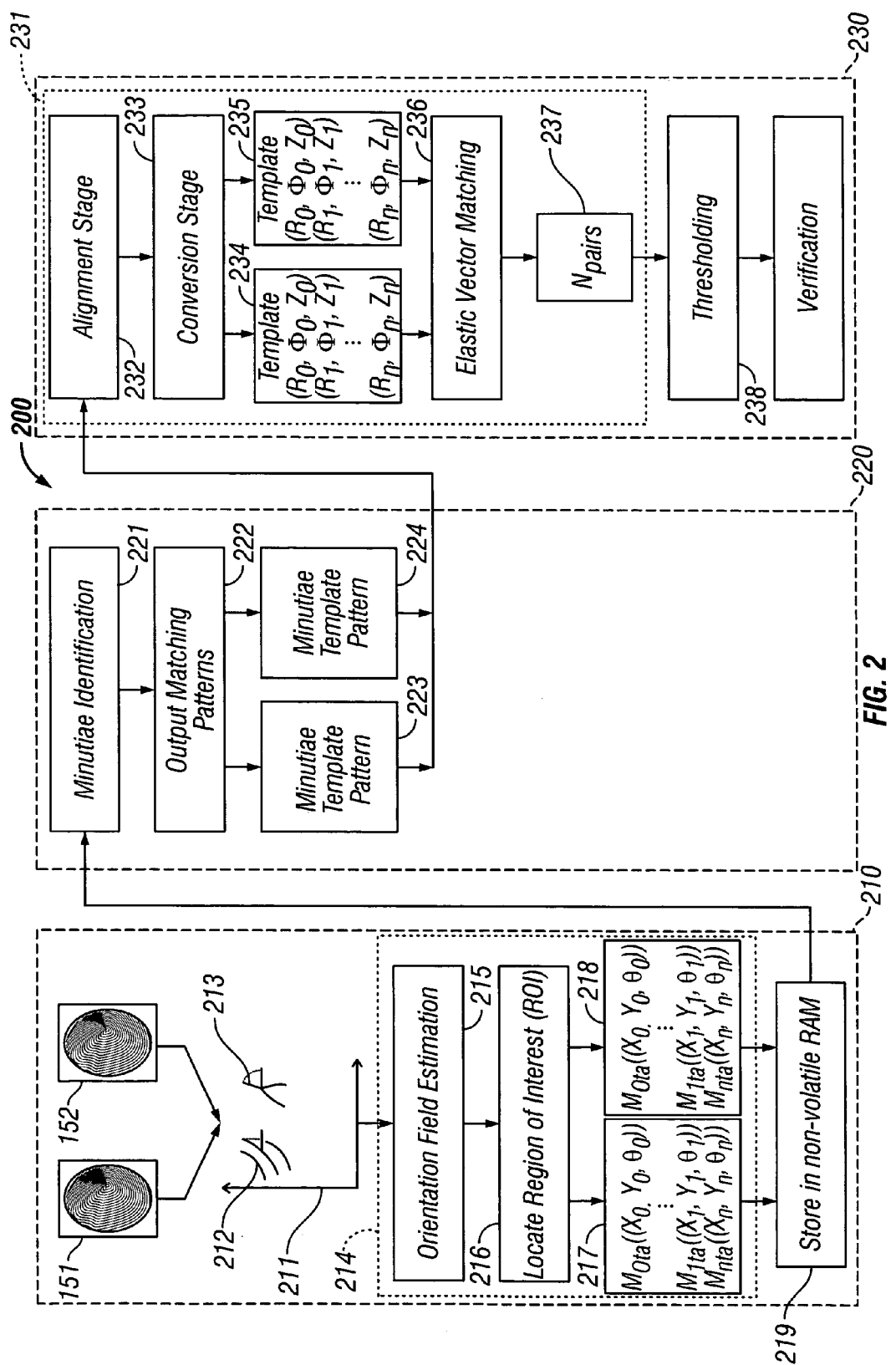
FIG. 2 shows in functional block diagram a representation of minutiae analysis of the present invention.
Figure 3:
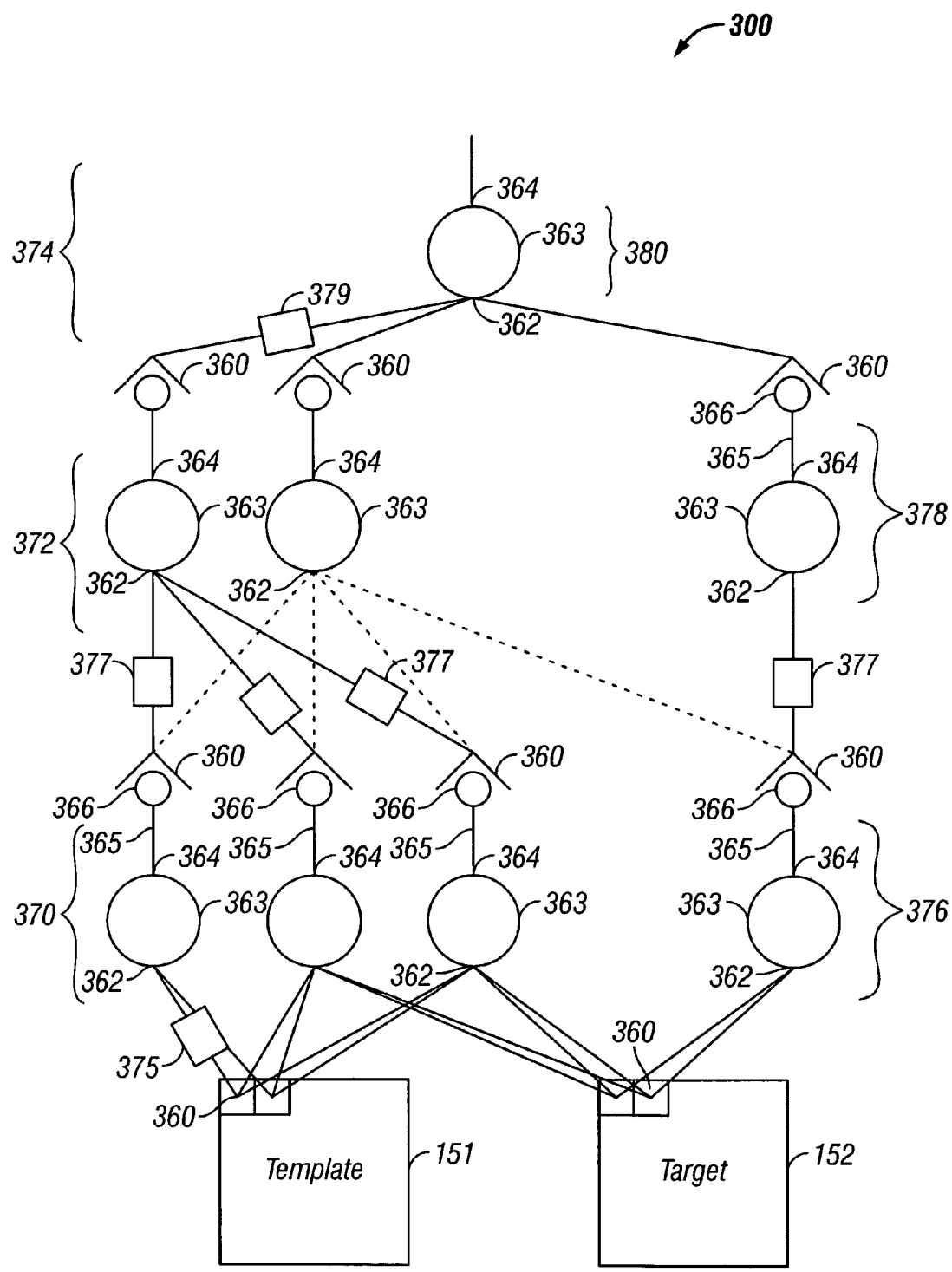
FIG. 3 shows in functional block diagram a representation of a neural network of the present invention.

As shown in FIG. 2, the minutiae analysis 200, appropriate for implementation of the present invention includes the steps of minutiae detection 210, minutiae extraction 220 and minutia matching 230. First, the fingerprint sensor 120 described in detail herein above, digitizes template fingerprint 151 (stored in disk storage device 118 during the enrollment process described further herein below) and target fingerprint 152 from human user 150 and generates local ridge characteristics 211. The two most prominent local ridge characteristics 211, called minutiae, are ridge ending 212 and ridge bifurcation 213. Additional minutiae suitable for inclusion in minutiae analysis 200 of the present invention exist such as "short ridge", "enclosure", and "dot" and may also be utilized by the present invention. A ridge ending 212 is defined as the point where a ridge ends abruptly. A ridge bifurcation 213 is defined as the point where a ridge forks or diverges into branch ridges. A fingerprint 151, 152 typically contains about 75 to 125 minutiae. The next step in minutiae analysis 200 of the present invention involves identifying and storing the location of the minutiae 212, 213 utilizing a minutiae cataloging algorithm 214. In minutiae cataloging 214, the local ridge characteristics from step 211 undergo an orientation field estimation 215 in which the orientation field of the input local ridge characteristics 211 acquired by fingerprint sensor 120 are estimated and a region of interest 216 is identified. At this time, individual minutiae 212, 213 are located, and an X and Y coordinate vector representing the position of minutiae 212, 213 in two dimensional space as well as an orientation angle θ is identified for template minutiae 217 and target minutiae 218. Each are stored 219 in random access memory (RAM) 114.

Next, minutiae extraction 220 is performed for each detected minutiae previously stored in step 219 above. Each of the stored minutiae 219 are analyzed by a minutiae identification algorithm 221 to determine if the detected minutiae 219 are one of a ridge ending 212 or ridge bifurcation 213. The matching-pattern vectors which are used for alignment in the minutiae matching 230 step, are represented as two-dimensional discrete signals which are normalized by the average inter-ridge distance. A matching-pattern generator 222 is employed to produce standardized vector patterns for comparison. The net result of the matching-pattern generator 222 are minutiae matching patterns 223 and 224. With respect to providing verification of a fingerprint as required by the present invention, minutiae template pattern 223 is produced for the enrolled fingerprint 151 of human user 150 and minutiae target pattern 224 is produced for the real-time fingerprint 152 of human user 150.

Subsequent minutiae extraction 220, the minutiae matching 230 algorithm determines whether or not two minutiae matching patterns 223, 224 are from the same finger of said human user 150. A similarity metric between two minutiae matching patterns 223, 224 is defined and a thresholding 238 on the similarity value is performed. By representing minutiae matching patterns 223, 224 as two-dimensional "elastic" point patterns, the minutiae matching 230 may be accomplished by "elastic" point pattern matching, as is understood by anyone of ordinary skill in the art, as long as it can automatically establish minutiae correspondences in the presence of translation, rotation and deformations, and detect spurious minutiae and missing minutiae. An alignment-based "elastic" vector matching algorithm 231 which is capable of finding the correspondences between minutiae without resorting to an exhaustive search is utilized to compare minutiae template pattern 223, with minutiae target pattern 224. The alignment-based "elastic" matching algorithm 231 decomposes the minutiae matching into three stages: (1) An alignment stage 232, where transformations such as translation, rotation and scaling between a template pattern 223 and target pattern 224 are estimated and the target pattern 224 is aligned with the template pattern 223 according to the estimated parameters; (2) a conversion stage 233, where both the template pattern 223 and the target pattern 224 are converted to vectors 234 and 235 respectively in the polar coordinate system; and (3) An "elastic" vector matching algorithm 236 is utilized to match the resulting vectors 234, 235 wherein the normalized number of corresponding minutiae pairs 237 is reported. Upon completion of the alignment-based "elastic" matching 231, a thresholding 238 is thereafter accomplished. In the event the number of corresponding minutiae pairs 237 is less than the threshold 238, a signal indicative of non-verification is generated by computer 113. Conversely, in the event the number of corresponding minutiae pairs 237 is greater than the threshold 238, a signal indicative of verification is generated by computer 113. Either signal can be utilized to produce a control signal which is communicated by computer 113 to interface electronics 119 via communication cable 121 as described in detail herein above.

Referring now particularly to FIG. 3, and according to a second preferred embodiment, an exemplary neural network 300 of the present invention includes at least one layer of trained neuron-like units, and preferably at least three layers. The neural network 300 includes input layer 370, hidden layer 372, and output layer 374. Each of the input layer 370, hidden layer 372, and output layer 374 include a plurality of trained neuron-like units 376, 378 and 380, respectively.

Neuron-like units 376 can be in the form of software or hardware. The neuron-like units 376 of the input layer 370 include a receiving channel for receiving digitized human fingerprint data 152, and stored comparison fingerprint data 151 wherein the receiving channel includes a predetermined modulator 375 for modulating the signal.

The neuron-like units 378 of the hidden layer 372 are individually receptively connected to each of the units 376 of the input layer 370. Each connection includes a predetermined modulator 377 for modulating each connection between the input layer 370 and the hidden layer 372.

The neuron-like units 380 of the output layer 374 are individually receptively connected to each of the units 378 of the hidden layer 372. Each connection includes a predetermined modulator 379 for modulating each connection between the hidden layer 372 and the output layer 374. Each unit 380 of said output layer 374 includes an outgoing channel for transmitting the output signal.

Each neuron-like unit 376, 378, 380 includes a dendrite-like unit 360, and preferably several, for receiving incoming signals. Each dendrite-like unit 360 includes a particular modulator 375, 377, 379 which modulates the amount of weight which is to be given to the particular characteristic sensed as described below. In the dendrite-like unit 360, the modulator 375, 377, 379 modulates the incoming signal and subsequently transmits a modified signal 362. For software, the dendrite-like unit 360 comprises an input variable $X_a$ and a weight value $W_a$ wherein the connection strength is modified by multiplying the variables together. For hardware, the dendrite-like unit 360 can be a wire, optical or electrical transducer having a chemically, optically or electrically modified resistor therein.

Each neuron-like unit 376, 378, 380 includes a soma-like unit 363 which has a threshold barrier defined therein for the particular characteristic sensed. When the soma-like unit 363 receives the modified signal 362, this signal must overcome the threshold barrier whereupon a resulting signal is formed. The soma-like unit 363 combines all resulting signals 362 and equates the combination to an output signal 364 indicative of one of a recognition or non-recognition of a human user 150.

For software, the soma-like unit 363 is represented by the sum $\alpha = \Sigma_a X_a W_a - \beta$, where $\beta$ is the threshold barrier. This sum is employed in a Nonlinear Transfer Function (NTF) as defined below. For hardware, the soma-like unit 363 includes a wire having a resistor; the wires terminating in a common point which feeds into an operational amplifier having a nonlinear component which can be a semiconductor, diode, or transistor.

The neuron-like unit 376, 378, 380 includes an axon-like unit 365 through which the output signal travels, and also includes at least one bouton-like unit 366, and preferably several, which receive the output signal from the axon-like unit 365. Bouton/dendrite linkages connect the input layer 370 to the hidden layer 372 and the hidden layer 372 to the output layer 374. For software, the axon-like unit 365 is a variable which is set equal to the value obtained through the NTF and the bouton-like unit 366 is a function which assigns such value to a dendrite-like unit 360 of the adjacent layer. For hardware, the axon-like unit 365 and bouton-like unit 366 can be a wire, an optical or electrical transmitter.

The modulators 375, 377, 379 which interconnect each of the layers of neurons 370, 372, 374 to their respective inputs determines the classification paradigm to be employed by the neural network 300. Digitized human fingerprint data 152, and stored comparison fingerprint data 151 are provided as discrete inputs to the neural network and the neural network then compares and generates an output signal in response thereto which is one of recognition or non-recognition of the human user 150.

It is not exactly understood what weight is to be given to characteristics which are modified by the modulators of the neural network, as these modulators are derived through a training process defined below.

The training process is the initial process which the neural network must undergo in order to obtain and assign appropriate weight values for each modulator. Initially, the modulators 375, 377, 379 and the threshold barrier are assigned small random non-zero values. The modulators can each be assigned the same value but the neural network's learning rate is best maximized if random values are chosen. Digital human fingerprint data 151 and stored comparison fingerprint data 152 are fed in parallel into the dendrite-like units of the input layer (one dendrite connecting to each pixel in fingerprint data 151 and 152) and the output observed.

The Nonlinear Transfer Function (NTF) employs α in the following equation to arrive at the output:

$$NTF = 1/[1+e^{-\alpha}]$$

For example, in order to determine the amount weight to be given to each modulator for any given human fingerprint, the NTF is employed as follows:

If the NTF approaches 1, the soma-like unit produces an output signal indicating recognition. If the NTF approaches 0, the soma-like unit produces an output signal indicating non-recognition.

If the output signal clearly conflicts with the known empirical output signal, an error occurs. The weight values of each modulator are adjusted using the following formulas so that the input data produces the desired empirical output signal.

For the output layer:

$W^*_{kol} = W_{kol} + GE_k Z_{kos}$ $W^*_{kol}$=new weight value for neuron-like unit k of the outer layer.

$W_{kol}$=current weight value for neuron-like unit k of the outer layer.

G=gain factor $Z_{kos}$=actual output signal of neuron-like unit k of output layer.

$D_{kos}$=desired output signal of neuron-like unit k of output layer.

$E_k = Z_{kos}(1-Z_{kos})(D_{kos}-Z_{kos})$, (this is an error term corresponding to neuron-like unit k of outer layer).

For the hidden layer:

$W^*_{jhl} = W_{jhl} + GE_j Y_{jos}$ $W^*_{jhl}$=new weight value for neuron-like unit j of the hidden layer.

$W_{jhl}$=current weight value for neuron-like unit j of the hidden layer.

G=gain factor $Y_{jos}$=actual output signal of neuron-like unit j of hidden layer.

$E_j = Y_{jos}(1-Y_{jos})\Sigma_k(E_k * W_{kol})$, (this is an error term corresponding to neuron-like unit j of hidden layer over all k units).

For the input layer:

$W^*_{iil} = W_{iil} + GE_i X_{ios}$ $W^*_{iil}$=new weight value for neuron-like unit I of input layer.

$W_{iil}$=current weight value for neuron-like unit I of input layer.

G=gain factor $X_{ios}$=actual output signal of neuron-like unit I of input layer.

$E_i = X_{ios}(1-X_{ios})\Sigma_j(E_j * W_{jhl})$, (this is an error term corresponding to neuron-like unit input layer over all j units).

The training process consists of entering new (or the same) exemplar data into neural network 300 and observing the output signal with respect to a known empirical output signal. If the output is in error with what the known empirical output signal should be, the weights are adjusted in the manner described above. This iterative process is repeated until the output signals are substantially in accordance with the desired (empirical) output signal, then the weight of the modulators are fixed.

Upon fixing the weights of the modulators, predetermined fingerprint-space memory indicative of recognition and non-recognition are established. The neural network 300 is then trained and can make generalized comparisons of human fingerprint input data by projecting said input data into fingerprint-space memory which most closely corresponds to that data. It is important to note that the neural network 300 described herein above is sensitive to scale, rotation and translation of the input fingerprint patterns. Therefore, pre-processing steps such as those described in detail herein above as employed by minutiae analysis 200 of the present invention should be utilized prior to presenting the fingerprint patterns to the neural network 300.

The description provided for neural network 300 as utilized in the present invention 100 is but one technique by which a neural network algorithm can be employed. It will be readily apparent to those who are of ordinary skill in the art that numerous neural network paradigms including multiple (sub-optimized) networks as well as numerous training techniques can be employed to obtain equivalent results to the method as described herein above.

The preferred method of registering and subsequently identifying a human user 150, of the present invention 100 begins with the human user 150, enrolling an authorized fingerprint(s) from one or more fingers to be utilized as a template(s) for all subsequent verifications. To accomplish this, the human user 150 enters personal information such as name, nickname, age, sex, and an optional PIN number for example, into computer 113 whereupon said information is stored in a user file on fixed disk 118 and in so doing initiates the enrollment process. The computer 113 subsequently acquires several digitized first human fingerprints of the human user 150 through the use of fingerprint sensor 120 embedded in toy 127. These first human fingerprints are processed, the highest quality fingerprint(s) selected and thenceforth encoded and stored in the fixed disk 118 of computer 113. This remaining first human fingerprint will be utilized thereafter as an authorized template fingerprint(s) 151. The above described process can be repeated if the user wishes to enroll additional fingerprints from other fingers on the user's hand. Typically, for this application four template fingerprints 151 are sufficient for reliable recognition of human user 150. In addition, other human users, such as family members and friends, can be enrolled by utilizing a process similar to that described for human user 150 herein above.

With respect to Internet access control of the present invention 100, the enrollment process described herein above is utilized for each authorized user 150 and is further controlled by a system administrator who is also an authorized human user 150. The system administrator would be responsible for providing additional information for each user pertaining to the Internet web sites each of said authorized human users 150 would be allowed to visit. In this way, the administrator, which could be a parent or guardian, can individually control what Internet access is granted for each of said other human users 150. The toy 127, upon recognizing each individual human user, would only permit the user to visit the web sites which were previously identified by the system administrator. Each of said human users 150 would be unable to change which sites could be visited without the permission of the system administrator.

Once the human user(s) 150 have been enrolled as described in detail herein above, the toy 127 enters the identification mode wherein it is capable of recognizing a human user 150. There are myriad applications for toy 127, which can make use of the capability of recognizing a human user 150. These applications include various games, educational and interactive software, and the ability to protect users, and more particularly children, from inappropriate Internet web site content. In addition, the toy could provide biometric security for Internet access including protecting the privacy of electronic correspondence (email).

When a human user 150 selects a program stored in computer 113 for interacting with the toy 127, the human user 150 will be instructed to touch the fingerprint sensor 120 embedded in toy 127 and thus triggering a verification event. Once human user 150 touches fingerprint sensor 120 with one of the fingers or thumb previously enrolled as described in detail herein above, fingerprint sensor 120 begins acquiring second human fingerprints of the human user 150 and converts said second human fingerprints to digital data which is subsequently transmitted to computer 113 via interface electronics 119. The digitized second human fingerprint(s) obtained thereafter are stored in the non-volatile RAM memory 114 of computer 113 as target fingerprint(s) 152.

Once the said target fingerprint(s) 152 has been stored in the computer 113, the verification software 140, either minutiae analysis 200 or neural network 300, or another suitable algorithm is employed to perform a comparison between said stored template fingerprint(s) 151 and said stored target fingerprint(s) 152 and produce an output signal in response thereto indicative of recognition or non-recognition of the human user 150. The output signal is subsequently utilized by the software to generate a control signal which can include animation and articulation control for toy 127. The control signal is therewith provided to the interface electronics 119 via communications cable 121. Interface electronics 119 is additionally responsible for interfacing the computer 113 with toy's 127 control electronics 128 and enabling the transfer of signals thereto. In the event the said target fingerprint(s) 152 of human user 150 is recognized, the software can be designed to provide a variety of control signals to toy 127, or can utilize the recognition signal internally as would be the case in controlling Internet web site access. In the event the said target fingerprint(s) 152 of human user 150 is not recognized, the software can be disabled thus preventing access to the program, game or Internet by an unrecognized and unauthorized human user. In addition, in the event target fingerprint(s) 152 of human user 150 is not recognized, the apparatus 100 can optionally notify an authorized system administrator in the event the non-recognition signal is erroneous and a product of a software fault.

The above described embodiments are set forth by way of example and are not for the purpose of limiting the claims of the present invention. It will be readily apparent to those or ordinary skill in the art that obvious modifications, derivations and variations can be made to the embodiments without departing from the scope of the invention. For example, the fingerprint verification engine described above as either minutiae analysis or neural network could also be one of a statistical based system, template or pattern matching, or even rudimentary feature matching. Accordingly, the claims appended hereto should be read in their full scope including any such modifications, derivations and variations.

We claim:

1. An anthropomorphic or zoomorphic child's play toy providing interactive entertainment with multiple human users comprising:

an acquisition device adapted to acquire a representation of a fingerprint of one of said human users, and said acquisition device being adapted to produce a signal relative to the acquired representation; and a processor associated with said acquisition device in a manner to receive the produced signal from said acquisition device, said processor being adapted to compare the produced signal relative to data stored in memory and to provide an output signal indicative of recognition;

said processor being configured to collect and store information pertaining to each of said multiple human users on an ongoing basis to cause said toy to provide individualized entertaining interaction, including animated movements of the toy, with each of said multiple human users on an individualized basis;

wherein the anthropomorphic or zoomorphic child's play toy provides said individualized entertaining interaction in response to said output signal indicative of recognition.

2. The anthropomorphic or zoomorphic child's play toy of claim 1, wherein said toy comprises a doll and said acquisition device is mounted to said doll.

3. The anthropomorphic or zoomorphic child's play toy of claim 1, wherein:

said toy comprises a doll; and said acquisition device includes a fingerprint capture device contained within the body of said doll, said fingerprint capture device being situated to enable access by a human user.

4. The anthropomorphic or zoomorphic child's play toy of claim 3, wherein:

said processor is mounted to said doll in a space defined by said doll.

5. The anthropomorphic or zoomorphic child's play toy of claim 1, wherein:

said acquisition device comprises a fingerprint capture device for acquiring a representation of a fingerprint from said human user;

said acquisition device is adapted to produce a signal relative to the acquired representation of a fingerprint from said human user; and said processor is adapted to locate characteristic portions of said produced signal, the characteristic portions being portions that correspond to minutiae of said representation of a fingerprint from said human user.

6. The anthropomorphic or zoomorphic child's play toy of claim 5, wherein:

said processor is further adapted to store representations of produced signals received from said acquisition device; and said processor is adapted to compare a representation of a received signal relative to signal representations previously stored by said processor, to determine whether the received signal corresponds with a previous signal, and, if so, to provide an output signal indicative of recognition.

7. The anthropomorphic or zoomorphic child's play toy of claim 6, wherein:
said processor utilizes minutiae analysis to compare signal representations and determine whether the received signal corresponds with a previous signal.

8. An anthropomorphic or zoomorphic child's play toy capable of providing entertaining interaction with a human user comprising:
an acquisition device associated with said toy, said acquisition device being adapted to acquire a representation of a biometric characteristic of the human user in proximity to said toy, and said acquisition device being adapted to produce a signal relative to the acquired representation; and
a processor associated with said acquisition device in a manner to receive the produced signal from said acquisition device, said processor being adapted to compare the produced signal relative to stored data and to provide an output signal indicative of recognition;
said processor being configured to collect and store information pertaining to multiple human users on an ongoing basis to cause said toy to provide individualized entertaining interaction, including animated movements of the toy, with each of said multiple human users on an individualized basis;
wherein the toy provides said entertaining interaction in response to said output signal indicative of recognition.

9. An anthropomorphic or zoomorphic child's play toy comprising:
a fingerprint capture device and digitizer for acquiring a representation of a fingerprint from a human user;
a CPU associated with said fingerprint capture device and digitizer and capable of manipulating signals therefrom; and
software resident on said CPU for analyzing and recognizing said representation of a fingerprint and providing an output signal indicative of recognition;
said CPU being configured to collect and store information pertaining to multiple human users on an ongoing basis to cause said toy to provide individualized entertaining interaction, including animated movements of the toy, with each of said multiple human users on an individualized basis;
wherein the toy is operable to provide entertaining interaction with the human user in response to said output signal indicative of recognition.

10. The toy of claim 9, wherein:
said toy further comprises a speaker and sound controls whereby sounds produced by said toy may be controlled;
said sound controls are responsive to said signal to modify the sounds produced by said toy in relation to said signal.

11. The toy of claim 10, wherein:
said toy further comprises a microphone for the detection of sounds in the proximity of said toy; and
said software is adapted to recognize human speech included in sounds detected by said microphone and to produce signals for controlling the toy in response to recognized human speech.

12. The toy of claim 11, wherein:
said sound controls include software controls included in said software, said software controls being adapted to produce synthesized speech; and
said toy further comprises animation controls adapted to control one or more motions of the toy;
said animation controls are responsive to said signal to animate said toy in relation to said signal; and
said software is further adapted to produce synthesized speech choreographed with mechanical animation in response to recognition of said fingerprint of said human user.

* * * * *